May 21, 1968 H. C. SWIFT 3,384,204
DISK BRAKE
Filed March 22, 1967 2 Sheets-Sheet 1
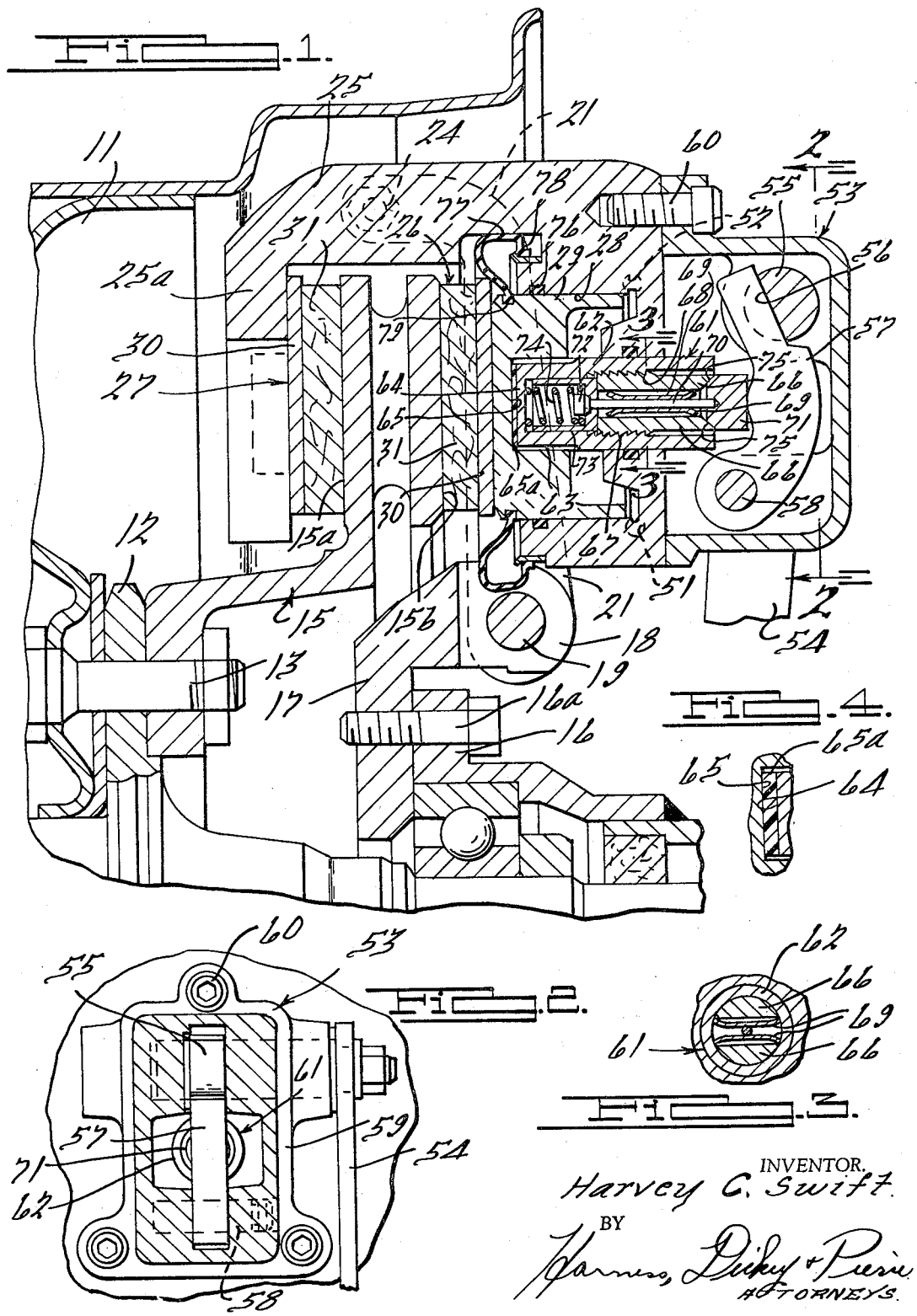
INVENTOR.
Harvey C. Swift
BY
Harness, Dickey & Pierce
ATTORNEYS

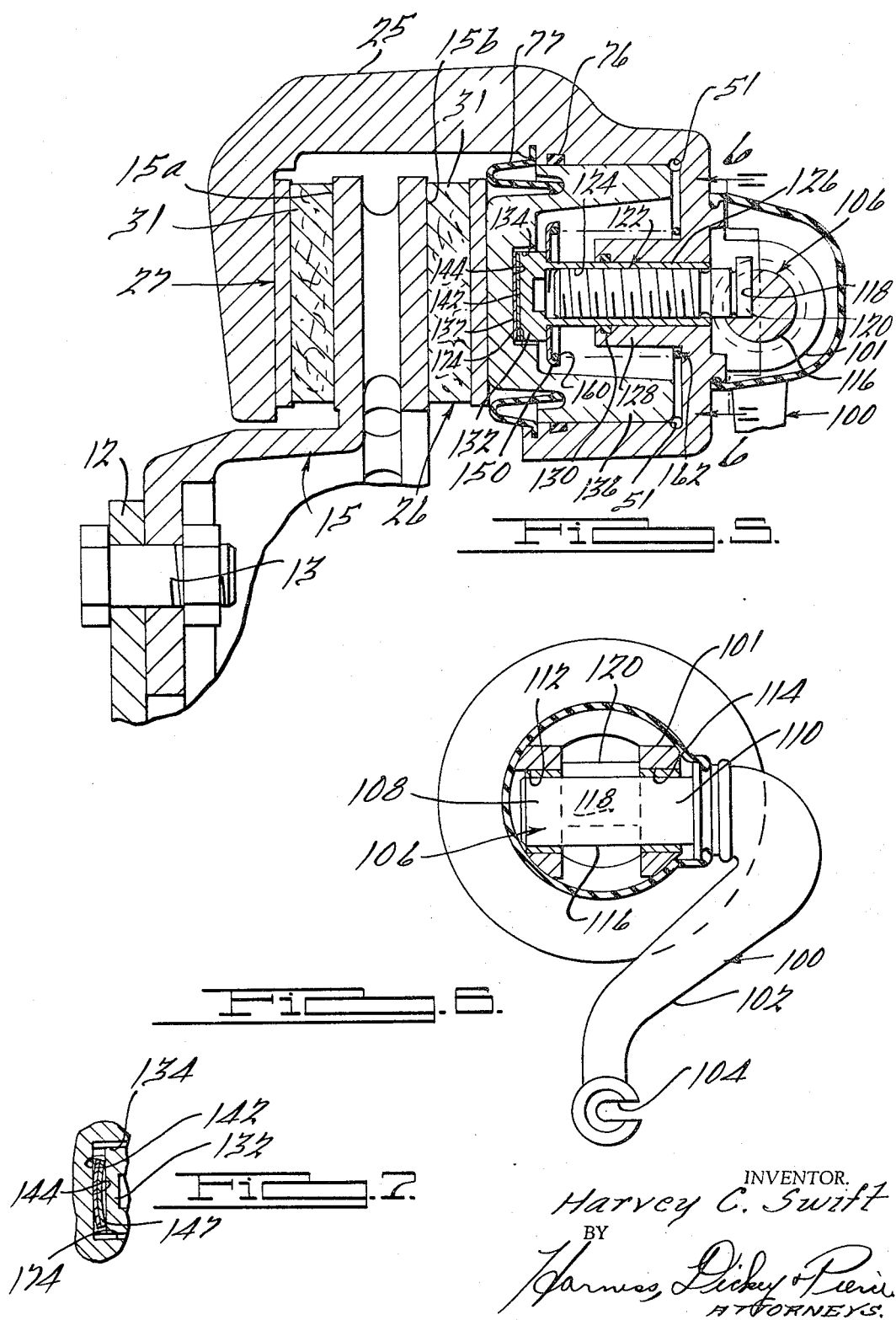

United States Patent Office 3,384,204
Patented May 21, 1968

3,384,204
DISK BRAKE
Harvey C. Swift, Birmingham, Mich., assignor to Kelsey-Hayes Company, Romulus, Mich., a corporation of Delaware
Filed Mar. 22, 1967, Ser. No. 625,056
10 Claims. (Cl. 188—73)

ABSTRACT OF THE DISCLOSURE

A disk brake of the sliding caliper type including means for automatically adjusting for brake lining wear and including means for delaying the adjustment until the temperature of the brake has been decreased to a given selected temperature range after braking operations have been completed.

Background of the invention

The invention relates to a disk brake of the sliding caliper type in which means are provided for automatically adjusting for brake lining wear.

Prior art

In prior art disk brakes of the sliding caliper type known to the applicant, there is provided a means for automatically adjusting the position of an operating piston as the brake linings wear. It is well known that as the brake linings come into engagement with a rotor of a disk to be braked the temperature of the rotor and the brake linings may rise to extremely high levels due to the frictional engagement of the rotor with the brake linings. As a result, the brake linings may, under the pressure of the actuating piston and caliper, compress or shrink in thickness when they are at these high temperatures. In these circumstances, the automatic adjusting means of the prior art may sense a false brake lining wear and may provide an adjustment that is in excess of the adjustment that should be made. This may result in excess drag of the brake linings and may cause them to wear at an excessive rate.

In the automatic brake adjustment mechanism of the present invention, the automatic adjustment for the brake lining wear will be delayed until the thermally responsive means and the brake linings return to a preselected temperature that may be in the range of the temperature of the ambient surrounding the brake lining.

Summary of the invention

In the present invention there is provided a disk brake for braking a rotatable disk and having a caliper supported for movement on a stationary torque plate. This caliper is adapted to straddle at least a portion of the rotatable disk and it operates a pair of opposed brake shoes having brake linings adapted to engage the rotatable disk when a fluid operated piston carried by the caliper is energized by any suitable means. A manually actuable lever for actuating the brakes may also be carried by the caliper.

An adjustable means having an adjustable part engaging an abutment which may be in the form of the manually actuable lever and the piston as the brake linings wear is also provided in this invention. A thermally responsive means is positioned between the abutment means and the piston, with the thermally responsive means expanding under high temperature to fill the space left as the piston moves to engage the brake shoes.

This thermally responsive means delays the adjustment of the piston to compensate for brake lining wear until the temperature of the thermally responsive means is reduced to a preselected temperature range.

Brief description of the drawings

FIGURE 1 is a cross sectional view of one of the embodiments of the invention.

FIGURE 2 is a sectional view taken along the lines 2—2 of FIGURE 1.

FIGURE 3 is a sectional view taken along the lines 3—3 of FIGURE 1.

FIGURE 4 is a cross sectional view taken in the same plane as FIGURE 1 showing the thermally responsive means of the automatic adjuster at an elevated temperature.

FIGURE 5 is a cross sectional view of a modified form of the present invention.

FIGURE 6 is a cross sectional view taken along the line 6—6 of FIGURE 5.

FIGURE 7 is a cross sectional view, in part similar to FIGURE 4, showing the temperature responsive device of the embodiment shown in FIGURES 5 and 6 at an elevated temperature.

Referring now to the drawings in which like reference numerals designate like parts throughout the several views thereof, there is shown in FIGURE 1 a vehicle wheel 11 secured to the axle flange 12 by means of studs or bolt and nut assemblies 13. A brake disk 15 of the ventilated type having spaced walls 15a and 15b is secured to the axle flange 12 by means of the same nut and bolt assemblies 13.

A fixed part 16 of the axle structure for the wheel 11 has a torque member 17 affixed thereto by means of bolts 16a. This torque member 17 has sleeve-like members 18 through which a shaft or rod 19 extends. A spacer sleeve (not shown) is positioned on the rod 19 between the sleeves 18. A pair of links 21 (only one of which is shown) are rotatably journaled along the shaft or rod 19. These links are freely rotatable on the shaft or rod 19 and the upper free end of each link 21 is freely journaled as at 24 to a caliper member 25 which straddles a portion of the periphery of the brake disk 15. The pivotal connection 24 of the links 21 to the caliper member 25 are independent of one another so that independent pivotal movement of the caliper member 25 on the pivotal connections 24 is possible. The pivotal connections 24 are in alignment with one another transversely of the caliper member 25 and are preferably arranged in radial alignment with the periphery of the rotor of the brake disk whereby the caliper is pivotally supported equidistant from the braking surfaces of the braking disk. The details of the construction described above are more fully shown in my copending application, Ser. No. 514,345, filed Dec. 16, 1965. It can be appreciated also that any suitable means for supporting the caliper on the torque plate may be provided.

One leg of the caliper 25 is provided with a recess or cylindrical bore 28 forming a cylinder to slidably receive a piston 29 to thereby form a fluid motor portion of the caliper 25. When fluid under pressure is admitted to recess 28, the piston 29 is moved to the left as viewed in FIGURE 1, and it engages the adjacent brake shoe 26 to move it against the face 15b of the rotor or brake disk 15. The reaction of the movement of the piston operates in the opposite direction to move the caliper 25 so that the other end 25a which forms the reaction portion of the caliper moves against the brake shoe 27 to force it into engagement with the face 15a of the brake disk 15. As a result, both brake shoes 26 and 27 are actuated simultaneously by the use of a single piston. Each brake shoe is provided with a backing plate 30 carrying a friction lining 31 adapted to engage the braking surfaces 15a and 15b of the brake disk 15 when piston 29 receives fluid under pressure.

As can readily be appreciated by an inspection of FIGURE 1, the brake shoes may be operated either hydraulically or manually. In order to operate the brake shoes hydraulically, fluid is admitted behind the piston 29 through an inlet 51. A bleed opening 52 is also formed in the caliper 25 in registry with the recess 28.

The brakes may also be operated manually by a means contained within a housing 53 and this means comprises a manually controlled operating lever 54 which is connected to a cam shaft 55 having a cam surface 56. The cam surface 56 engages the free end of a lever 57 pivotally mounted on a shaft 58 journaled in the housing 53. As can be readily appreciated by an inspection of the drawing, the housing 53 is secured by bolts or other suitable fastening means 60 to the fluid motor portion of the caliper 25.

An extensible means 61 comprises an outer sleeve-like member 62 having a longitudinally fluted portion 63 and a closed end portion 64 positioned in opposed relationship to an end wall 65 formed by the termination of a recess or cylindrical bore 65 in the piston 29. The piston 29 is movable relative to the sleeve-like member 62 when the brakes are applied hydraulically. During this time fluid under pressure may flow through the flutes 63 and act on the end portion 64 to hold the extensible means 61 in engagement with the lever 57.

A thermally responsive member 65a is interposed between the piston surface 65 and the extensible member 61. The thermally responsive member 65a may comprise a disk formed from a semi-solid plastic having a relatively high coefficient of thermal expansion, a bimetallic Belleville spring, or any other suitable device that expands under an increase in temperature. The depicted thermally responsive member 65a is illustrated as being a plastic disk having a high coefficient of thermal expansion.

A pair of segments 66 provided with abutment teeth 67 engaging internally arranged abutment teeth 68 is positioned in the interior of the sleeve-like member 62. The segments 66 are normally urged outwardly so as to insure engagement of the teeth 67, 68 by means of leaf springs 69. A rod 70 extends longitudinally of the extensible member 62 between the leaf springs 69 and has a wedge member 71 affixed thereto at the right hand end as the structure is view in FIGURE 1. The wedge member is engaged by the lever 57 and the other end of the rod 70 is provided with a head 72 which engages a slidable sleeve member 73. A spring 74 is arranged within the sleeve member 73 which normally urges the sleeve member 73 and the segments 66 toward the right and the sleeve member 62 toward the left.

When the piston 29 is actuated by the hydraulic pressure admitted through the opening 51, the extensible means 61 tends to move under hydraulic pressure to the right as viewed in FIGURE 1, and the piston 29 moves toward the left to actuate the brake shoe 26. Simultaneously the caliper 25 is shifted to the right to actuate the brake shoe 27. The actuation of the brake shoes 26 and 27 brings the linings 31 into frictional engagement with the braking faces 15a and 15b of the rotor 15. The temperature of the rotor, the brake linings and the caliper housing thus is increased considerably. The thermally responsive member 65a positioned between the end wall 65 and the extensible member 61, therefore, expands (FIGURE 4) and will remain in engagement with the extensible means 61 and with the end wall 65.

It can be appreciated that during this braking operation when the high temperatures exist, the brake linings 31 are subjected to extremely high temperatures and due to these extremely high temperatures, compression of the brake linings may occur so that the thickness of the brake linings is decreased. The thermally responsive member 65a in its expanded condition as shown, however, will hold off any adjustable movement of the extensible means 61 until the brake linings and the thermally responsive member 65a have had a chance to cool to a given preselected temperature where the thermall responsive member 65a is returned to its normal state (FIGURE 1).

After the thermally responsive member 65 has cooled and contracted (FIGURE 1), the expansible means 61 will effect an automatic adjustment of the at-rest position of the piston 29 if sufficient wear of the linings 31 has taken place. Under this condition, the coil spring 74 will urge the segments 66 to the right and the sleeve member 62 to the left as shown in FIGURE 4. The segments 66 can move radially inwardly with respect to the teeth 68 on the sleeve 62 through compression of the leaf springs 69 until the necessary adjustment has been effected. This adjustment normally will be an amount equal to the distance between one adjacent pair of the teeth 67. After the adjustment has been effected, the leaf springs 69 will again urge the segments 66 into engagement with the teeth 68.

When the brake is manually operated by the lever 57, the force of the lever is exerted on the head 71 which holds the segments 66 into force transmitting engagement with the sleeve member 62 so that there is no relative movement between the segments 66 and the sleeve member 62 during the manual operation of the piston 29. During this time it can be appreciated that the force exerted is transmitted through the thermally responsive member 65a. The action of the thermally responsive member 65a during the hand braking operation is the same as it is when the brakes are operated by the hydraulic fluid under pressure.

As is conventional in disk brakes of this type, the piston 29 may be provided with an annular seal 76 which may be in the form of an O-ring. A boot 77 is attached to the caliper, as indicated at 78, and to the piston 29, as indicated at 79. This prevents dust and dirt from entering between the bore 28 in the caliper and the piston 29.

It can be appreciated, therefore, that in this particular embodiment of the invention the thermally responsive member 65a delays the operation of the automatic brake lining adjustment means until the thermally responsive member and the brake linings have had an opportunity to cool to a preselected temperature range where the thermally responsive member 65a is returned to its normal flat state.

A modified form of the invention is shown in FIGURES 5 through 7. In this modified form of the invention, there is provided as in the previously described embodiment a rotor 15 having the brake shoe engaging faces 15a and 15b with the rotor being attached to a rotatable flange 12 by means of the attaching means 13. The brake shoe engaging faces 15a and 15b are, as in the other embodiment of the invention, adapted to be engaged by the brake linings 31 of the brake shoes 26 and 27.

A hand operated lever 100 is provided having a generally curved operating means 102 that has an end portion 104 adapted to be connected to a suitable actuating means that may be operated by the vehicle operator. The hand operated lever 100 also has a generally cylindrical shaft 106 formed integrally therewith and having spaced cylindrical portions 108 and 110 which are journaled in spaced bearing means 112 and 114. The central portion 116 of the shaft 106 has a generally rectangular cutout portion 118 for the reception of a generally rectangular end portion 120 of a threaded stud 122. The threaded stud 122 is externally threaded with threads of a relatively low helix angle which cooperate with similarly formed threads 124 formed on the interior of a generally cylindrical sleeve 126. This cylindrical sleeve 126 is positioned for reciprocatory movement in a boss 128 formed on the fluid motor portion of the caliper 25, and it is sealed with respect to this boss by means of a seal 130.

A head 132 of the sleeve 126 which is generally cylindrical in configuration is received within a bore 134 formed in the end of a piston 136. A thermally responsive member 137 is disposed at the base of the bore 134 between an end surface 142 of the sleeve head 132 and an end wall 144 formed at the base of the bore 134. The thermally responsive member 137, like the member 65a of the previously described embodiment, may be a plastic having a high coefficient of thermal expansion, a bi-metallic Belleville spring or any other member having the desired temperature characteristics. In this embodiment, a bi-metallic Belleville spring is illustrated.

A spring retainer 150 is affixed against rotation relative to the sleeve 126 adjacent its head portion 132. A coil, torsional spring 160 bears against the spring retainer 150 and has one of its ends affixed against rotation with respect to the spring retainer 150. The coil spring 160 encircles the boss 128 and has its opposite end 162 in engagement with the caliper housing 25 and fixed against rotation thereto. The spring 160 thus exerts a rotational force upon the sleeve 126. Since the threaded stud 122 is retained against rotation by the coaction of its end portion 120 with the recess 118, the spring 160 tends to cause the sleeve end surface 142 to move away from the stud head portion 120.

It should be noted also that the cylindrical bore 134 has flutes 174 extending longitudinally thereof so that fluid under pressure that is admitted during braking operations through the orifice or opening 51, is applied against the end 142 of the sleeve head 132.

In the operation of this embodiment of the invention, fluid under pressure is applied to the piston 136 through the orifice or opening 51 thereby shifting the piston 136 to the left, as viewed in FIGURE 5, and shifting the caliper 25 to the right, as viewed in FIGURE 5. This brings the brake linings 31 of the brake shoes 26 and 27 into engagement with the brake shoe engaging faces 15b and 15a, respectively, of the rotor 15. The fluid under pressure admitted through the flutes 174 to the end 142 of the sleeve head 136 will maintain this sleeve in the position shown in the drawings.

The temperature increase brought about by the engagement of the brake linings 31 with the brake shoe engaging faces 15a and 15b of the rotor 15, will cause a rise in temperature of these brake linings and the heat that causes such a rise in temperature is transferred through the backing plate of the brake shoe 26 and through the piston 136 to the thermally expansible member 137 thereby causing it to bow as shown in FIGURE 7 and to fill the space between the end 142 of the sleeve head portion 136 and the opposed end wall 144 of the piston 136. It can be readily appreciated, therefore, that the thermally responsive member 137 has its outer periphery positioned in engagement with the surface 142 of the sleeve head portion 132 and has its central portion positioned against the end wall 144 of the cylindrical bore 134.

When the brake is returned to its unactuated position by the release of the brake pedal of the automotive vehicle so that fluid under pressure is no longer applied to the orifice or opening 51, the system will cool from the high temperatures that occur during the braking action. The thermally responsive member 137 will, therefore, flatten to its original position prior to the actuating of the brakes. At this time the brake linings 31 will expand in width back to their original dimension less any wear that has occurred during braking operations. If there has been any wear of the brake linings the spring 162 will rotate the sleeve 126 so that the head 132 of the sleeve is driven into engagement with the flattened thermally responsive member 137 to thereby compensate for any wear in the brake linings.

When the brake of the present invention is to be actuated by a hand operated means, the hand lever 100 is actuated by the actuating means attached to the end 104 thereby rotating the cylindrical shaft 106 in a counterclockwise direction as viewed in FIGURE 5. The force applied by this rotation will, therefore, be applied to the threaded stud 122 and will then be applied by the stud 122 to the sleeve 126 through the cooperating threads formed on the outer diameter of the stud 122 and the inner diameter of the sleeve 126. The helix angle of these threads is such that no relative movement may take place between the stud and the sleeve, and as a result, the stud 122 and the sleeve 126 are shifted to the left, as viewed in FIGURE 5, thereby shifting the piston 136 to the left and bringing the lining 31 of the brake shoe 26 into engagement with the brake engaging face 15b of the rotor 15. Simultaneously, the caliper 25 will be shifted to the right, as viewed in FIGURE 5, to bring the brake lining 31 into engagement with the brake shoe engaging face 15a of the rotor 15.

As was the case when the brakes were actuated by hydraulic fluid under pressure, the thermally responsive member 137 may expand into the position shown in FIGURE 7 to thereby prevent any automatic adjustment of the brake linings until the brake linings and the thermally responsive member 137 have cooled sufficiently to permit the thermally responsive member 137 to return to its normally flattened state.

It can readily be appreciated from the structure shown in the drawings and from the description given above, that a means is provided in the present invention for delaying the adjustment of the brake actuating piston to compensate for wear on the brake shoe linings until the brake has cooled into a range near ambient temperatures after braking operations have been completed.

While it will be apparent that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a disk brake for braking a rotatable disk, a caliper assembly fixed against rotation relative to the rotatable disk, a brake pad having a brake lining adapted to engage the rotatable disk, said brake lining being compressible under pressure at the elevated temperatures encountered during braking operation, a piston carried by said caliper assembly for actuating said brake pad into engagement with a surface of the rotatable disk, abutment means, automatically adjustable means operatively interposed between said abutment means and said brake pad for limiting the degree of movement of said brake pad away from the rotatable disk, and thermally responsive means associated with said automatically adjustable means, said thermally responsive means being responsive to an increase in the temperature of said brake pad for preventing operation of said automatically adjustable means until the temperature of said brake pad cools to a temperature below said elevated temperature and within a preselected range.

2. The combination of claim 1 in which said thermally responsive means is constructed and arranged to expand axially with respect to said piston and said automatically adjustable means as said thermally responsive means is heated during braking operations and is constructed and arranged to contract axially with respect to said piston and said adjustable means as said thermally responsive means cools after braking operations have been completed.

3. The combination of claim 1 in which said piston has a cylindrical bore positioned therein, one end of said automatically adjustable means being cylindrical in configuration and being positioned in said cylindrical bore, and said thermally responsive means being positioned in said cylindrical bore and interposed between said piston and said end of said automatically adjustable means.

4. The combination of claim 3 wherein the thermally responsive means comprises a bi-metallic Belleville spring.

5. The combination of claim 3 wherein the thermally responsive means comprises an annular disk formed from a material having a relatively high coefficient of thermal expansion.

6. The combination of claim 3 in which said automatically adjustable means comprises a sleeve member having interiorly arranged abutment teeth and including a segment positioned within said sleeve member provided with abutment teeth engaging the teeth on said sleeve member, and spring means urging said sleeve member and said segment longitudinally apart whereby said extensible member may be automatically adjusted by relative longitudinal movement of said sleeve member and said segment to compensate for wear on the brake linings.

7. The combination of claim 3 in which said automatically adjustable means comprises a first member having external helical threads, a second member having internal helical threads threaded onto said external threads of said first member, one of said members being affixed against rotation at one end thereof relative to said caliper assembly, the other of said members having one of its ends received in the cylindrical bore of said piston and biasing means for rotating the other of said members for elongating said automatically adjustable means.

8. The combination of claim 1 in which said abutment means comprises a manually actuable lever for actuating the brakes.

9. The combination of claim 6 in which said abutment means comprises a manually actuable lever for actuating the brakes.

10. In a disk brake for braking a rotatable disk, a caliper assembly fixed against rotation relative to the disk, a cylindrical bore formed in said caliper assembly and extending substantially normal to a surface of the disk, a piston supported for reciprocation within said cylindrical bore and defining a fluid cavity therewith, means for selectively introducing a fluid under pressure to said fluid cavity for reciprocating said piston, a brake pad having a brake lining juxtaposed to the surface of the disk and a backing plate engaged by one end of said piston, a cylindrical bore formed in said piston, extensible means supported by said caliper assembly and having a substantially cylindrical first end portion extending into said piston bore, means for axially fixing the other end of said extensible means relative to said caliper assembly, thermally responsive means interposed in said piston bore between said one end portion of said extensible means and said piston, said thermally responsive means being expansible in response to an increase in the temperature of said brake pad for urging said piston away from said one end of said extensible means, and automatic adjusting means for increasing the length of said extensible means when the temperature of said thermally responsive means decreases to a temperature within a preselected range and after a predetermined wear of said brake lining.

References Cited
UNITED STATES PATENTS

| | | | |
|---|---|---|---|
| 2,133,533 | 10/1938 | Brisson | 188—79.5 |
| 2,345,108 | 3/1944 | Goepfrich | 188—79.5 |
| 3,331,472 | 7/1967 | Swift | 188—73 |
| 3,337,008 | 8/1967 | Trachte | 188—196 |

MILTON BUCHLER, *Primary Examiner.*

GEORGE E. A. HALVOSA, *Examiner.*